(12) United States Patent
Brophy et al.

(10) Patent No.: US 9,160,544 B2
(45) Date of Patent: Oct. 13, 2015

(54) PROVIDING SECURE ACCESS TO COMPUTING RESOURCES IN A CLOUD COMPUTING ENVIRONMENT

(71) Applicant: Verizon Patent and Licensing Inc., Basking Ridge, NJ (US)

(72) Inventors: Timothy Brophy, Forest Hill, MD (US); Paul M. Curtis, Sudbury, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 39 days.

(21) Appl. No.: 14/168,170

(22) Filed: Jan. 30, 2014

(65) Prior Publication Data

US 2015/0215130 A1     Jul. 30, 2015

(51) Int. Cl.
*H04L 29/06* (2006.01)
*H04L 9/32* (2006.01)

(52) U.S. Cl.
CPC ............ *H04L 9/3268* (2013.01); *H04L 63/062* (2013.01)

(58) Field of Classification Search
CPC ............................ H04L 9/3268; H04L 63/062
See application file for complete search history.

(56) References Cited

U.S. PATENT DOCUMENTS

| | | | |
|---|---|---|---|
| 2003/0126441 A1* | 7/2003 | Laux et al. | 713/168 |
| 2010/0189014 A1* | 7/2010 | Hogan et al. | 370/255 |
| 2011/0213969 A1* | 9/2011 | Nakhjiri et al. | 713/158 |
| 2013/0212367 A1* | 8/2013 | Ingalls et al. | 713/2 |
| 2013/0227292 A1* | 8/2013 | Suffling | 713/171 |
| 2014/0013099 A1* | 1/2014 | Sekiguchi et al. | 713/100 |

* cited by examiner

*Primary Examiner* — Nirav B Patel
*Assistant Examiner* — Mohammed Waliullah

(57) ABSTRACT

A security device may receive a request, associated with a user, to access a particular device. The security device may authenticate the user based on the request. The security device may determine a key, from a set of keys stored by the security device, that is unassigned, and may assign the key to the user. The security device may mark the key as assigned. The security device may provide the key to the particular device, which may cause the particular device to validate the key by comparing the key to a set of valid keys. The set of valid keys may be stored in a memory accessible by the particular device based on having been previously provided to the particular device by the security device. The security device may establish a session with the particular device, and may provide the user with access to the particular device via the session.

20 Claims, 10 Drawing Sheets

PROVIDING SECURE ACCESS TO COMPUTING RESOURCES IN A CLOUD COMPUTING ENVIRONMENT

BACKGROUND

Cloud computing is the use of computing resources (e.g., hardware, software, storage, computing power, etc.) that are available from a remote location and accessible over a network, such as the Internet. Cloud computing environments deliver a computing resource as a service rather than as a product, whereby shared computing resources are provided to user devices (e.g., computers, smart phones, etc.). Customers may buy these computing resources and use the computing resources on an on-demand basis. Cloud computing environments provide services that do not require end-user knowledge of a physical location and configuration of a system that delivers the services.

DETAILED DESCRIPTION OF PREFERRED EMBODIMENTS

The following detailed description of example implementations refers to the accompanying drawings. The same reference numbers in different drawings may identify the same or similar elements.

In a cloud computing environment, a user may be authenticated prior to being permitted to access a computing resource, such as a server. Authentication may involve validating the user's credentials (e.g., username and password) using a central authentication server. However, authenticating users in this manner requires a network connection with the central authentication server. Such a connection may become disconnected, thus preventing users from accessing computing resources. Implementations described herein provide authentication without the need for a central authentication server, thus improving the reliability of the authentication process. Furthermore, implementations described herein assist in logging user actions performed in connection with an accessed computing resource.

Figure 1A:
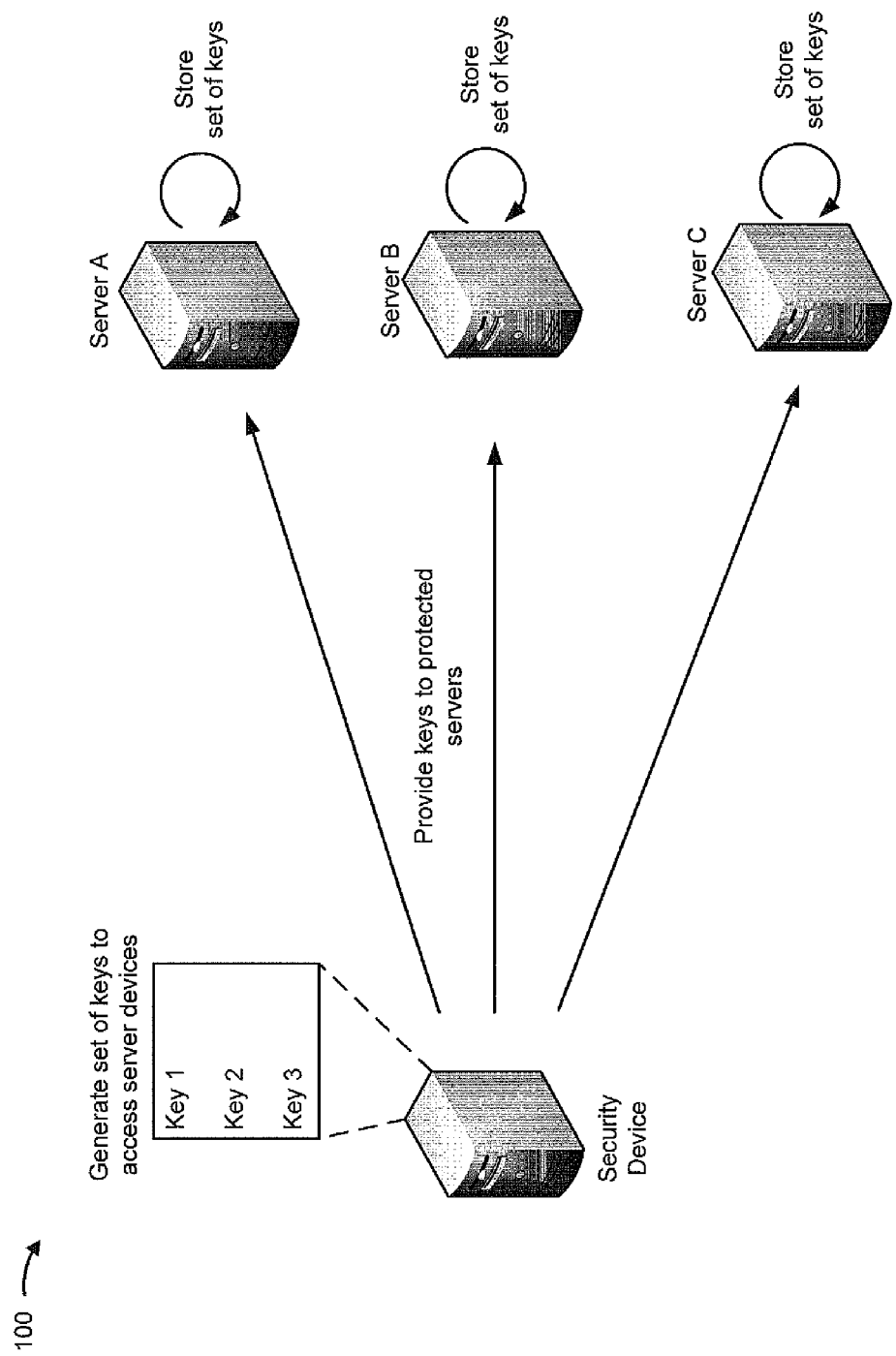
FIGS. 1A and 1B are diagrams of an overview of an example implementation described herein.
Figure 1B:
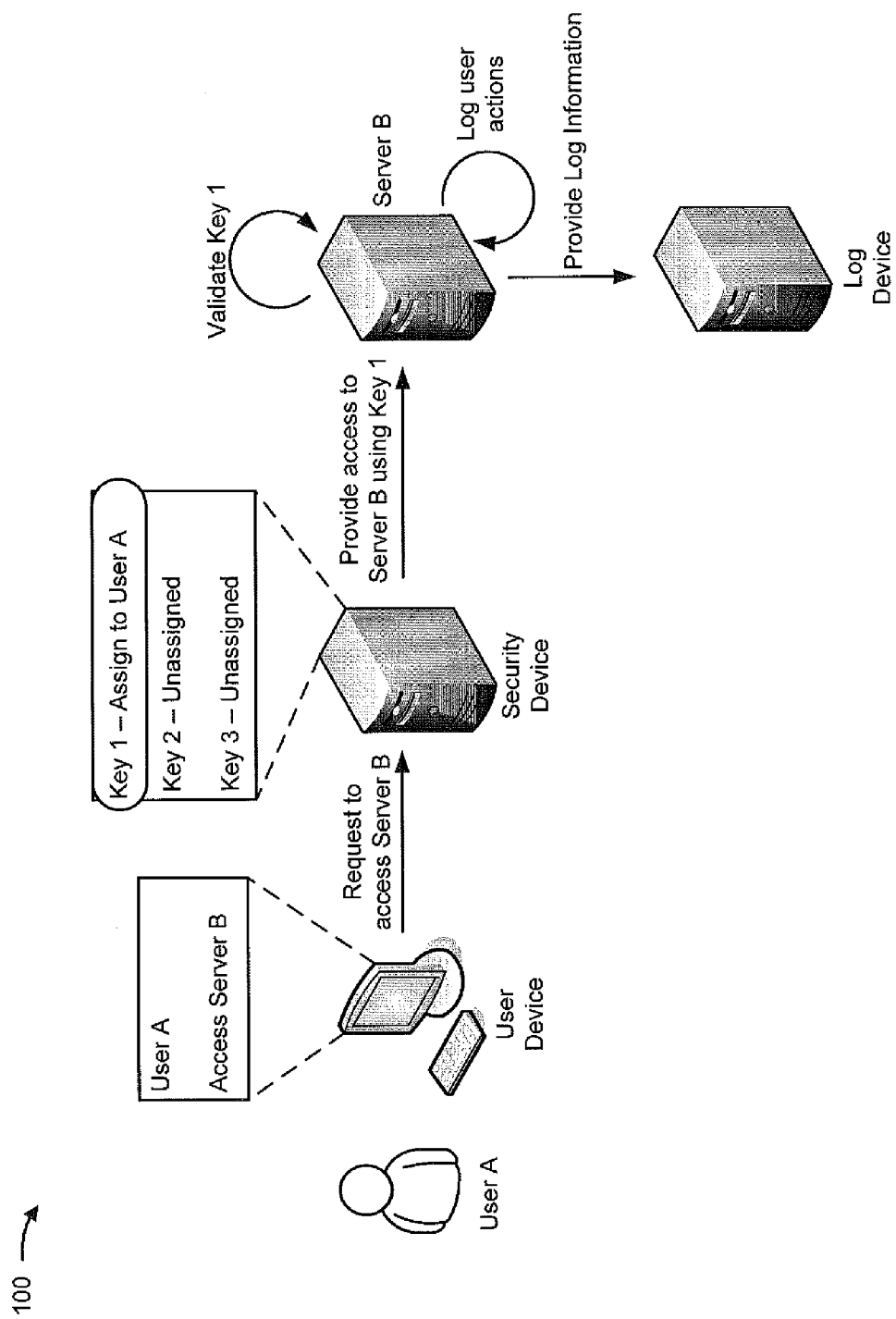

FIGS. 1A and 1B are diagrams of an overview of an example implementation 100 described herein. As shown in FIG. 1A, a security device, such as a firewall, a gateway, a server, etc., may generate a set of keys to be used to access server devices, shown as Server A, Server B, and Server C. The server devices may include computing resources that are part of a cloud computing environment, in some implementations. As further shown, the security device may provide the generated keys to the server devices, and each server device may store information that identifies the set of keys.

As shown in FIG. 1B, a user may interact with a user device, such as a desktop computer, a laptop computer, a mobile phone, etc., to request access to a server device (e.g., using a web browser). For example, a user identified as User A may request access to a server device identified as Server B. The user device may transmit the request to the security device. The security device may authenticate User A (e.g., using user credentials stored by the security device), and may determine an unassigned key to assign to User A when User A is authenticated. For example, assume that the security device assigns a key identified as Key 1 to User A.

As further shown in FIG. 1B, the security device may provide User A with access to Server B using Key 1. For example, the security device may provide Key 1 to Server B, and Server B may access a memory to determine whether Key 1 is a valid key (e.g., by comparing Key 1 to the set of keys stored by Server B as described in connection with FIG. 1A). Upon validating Key 1, Server B may permit User A to access Server B, such as via a session with the security device. Server B may log actions taken by User A during the session, such as commands received from the user device, login requests, logout requests, etc. Server B may provide this log information to a log device, such as a storage device, a server, etc., which may store the log information for later use. In this way, a user may be authenticated for access to a server device (e.g., a distributed computing resource) without requiring the server device to access a central authentication server to perform the authentication.

Figure 2:
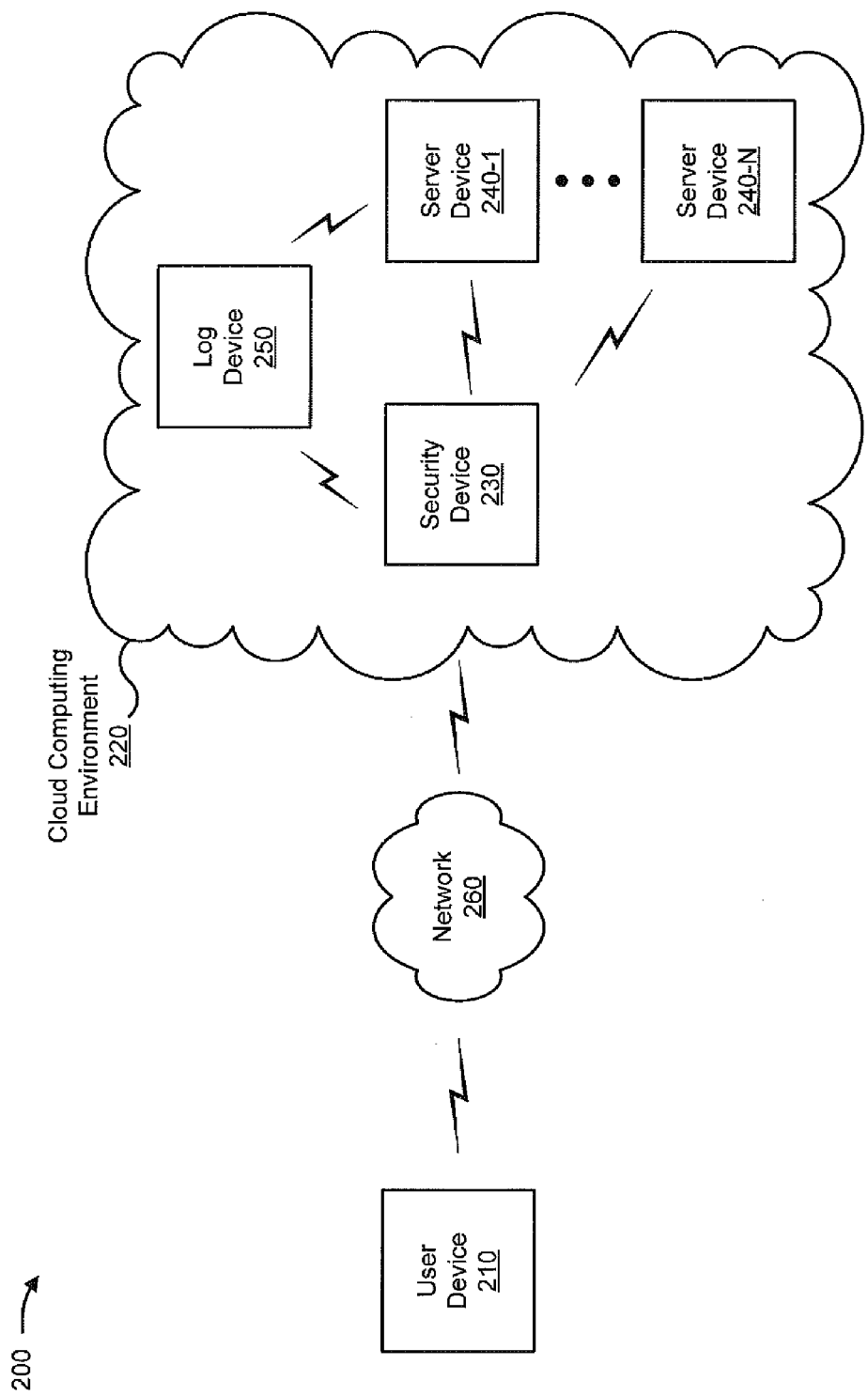
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a cloud computing environment 220, a security device 230, one or more server devices 240-1 through 240-N (N≥1) (hereinafter referred to individually as "server device 240" and collectively as "server devices 240"), a log device 250, and a network 260. In some implementations, security device 230, server device 240, and log device 250 may be included in cloud computing environment 220. Devices of environment 200 may interconnect via wired connections, wireless connections, or a combination of wired and wireless connections.

User device 210 may include one or more devices capable of communicating with cloud computing environment 220 (e.g., via network 260). For example, user device 210 may include a computing device, such as a desktop computer, a laptop computer, a tablet computer, a mobile device (e.g., a radiotelephone, a smart phone, etc.), or a similar device. In some implementations, user device 210 may be associated with a user that receives a service from cloud computing environment 220 and/or that may access server device 240 associated with cloud computing environment 220.

Cloud computing environment 220 may include an environment that delivers computing as a service, whereby shared resources, services, etc. may be provided to user device 210. Cloud computing environment 220 may provide computation, software, data access, storage, etc. services that do not require end-user (e.g., user device 210) knowledge of a physical location and configuration of a system and/or a device that delivers the services. As shown, cloud computing environment 220 may include security device 230, a set of server devices 240, and log device 250.

Security device 230 may include one or more devices capable of processing and/or transferring traffic between user device 210 and server device 240 and/or capable of providing access to server device 240. For example, security device 230 may include a network device, such as a reverse proxy, a server (e.g., a proxy server), a traffic transfer device, a gateway, a firewall, a router, a bridge, a hub, a switch, a load balancer, or the like. Security device 230 may be used in connection with a single server device 240 or a group of server devices 240 (e.g., a data center, a private network, a cloud computing environment, etc.). Communications may be routed through security device 230 to reach the group of server devices 240. For example, security device 230 may be positioned within a network as a gateway to a private network that includes the group of server devices 240. Additionally, or alternatively, communications from user device 210 may be encoded such that the communications are routed to security device 230 before being routed to server device 240.

Server device 240 may include one or more devices that provide services to user device 210. For example, server device 240 may include a server (e.g., a host server, a web server, etc.), a workstation computer, a desktop computer, or a similar device. A service provided by server device 240 may include an information processing service, a storage service, a data transfer service, etc. For example, server device 240 may execute an application, a virtual machine, a virtualized storage, a hypervisor, etc. In some implementations, server device 240 may communicate with one or more other server devices 240 via wired connections, wireless connections, or a combination of wired and wireless connections.

Log device 250 may include one or more devices capable of receiving, processing, storing, and/or providing information (e.g., log information). For example, log device 250 may include a server (e.g., a storage server, a database server, etc.), a storage device, or a similar device. Log device 250 may receive log information from security device 230 and/or server device 240. The log information may identify actions, performed by a user, associated with requesting access to server device 240 and/or actions performed during a session with server device 240.

Network 260 may include one or more wired and/or wireless networks. For example, network 260 may include a wireless local area network (WLAN), a local area network (LAN), a wide area network (WAN), a metropolitan area network (MAN), a telephone network (e.g., the Public Switched Telephone Network (PSTN)), a cellular network, a public land mobile network (PLMN), an ad hoc network, an intranet, the Internet, a fiber optic-based network, or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
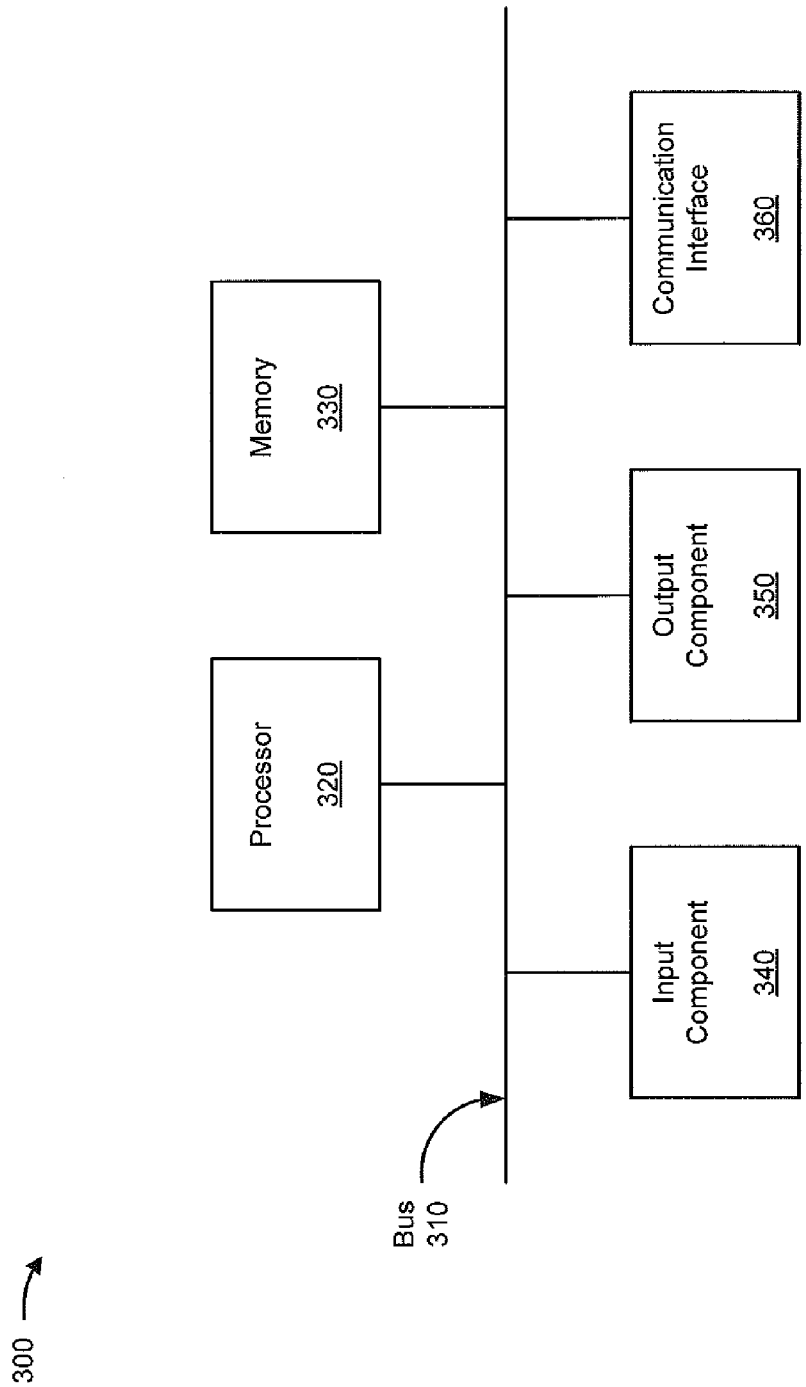
FIG. 3 is a diagram of example components of one or more devices of FIG. 2.

FIG. 3 is a diagram of example components of a device 300. Device 300 may correspond to user device 210, security device 230, server device 240, and/or log device 250. In some implementations, each of user device 210, security device 230, server device 240, and/or log device 250 may include one or more devices 300 and/or one or more components of device 300. As shown in FIG. 3, device 300 may include a bus 310, a processor 320, a memory 330, an input component 340, an output component 350, and a communication interface 360.

Bus 310 may include a component that permits communication among the components of device 300. Processor 320 may include a processor (e.g., a central processing unit, a graphics processing unit, an accelerated processing unit), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions included in a computer-readable medium, such as memory 330. A computer-readable medium is defined herein as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, one or more of the components of device 300 may perform one or more functions described as being performed by another one or more components of device 300.

Figure 4:
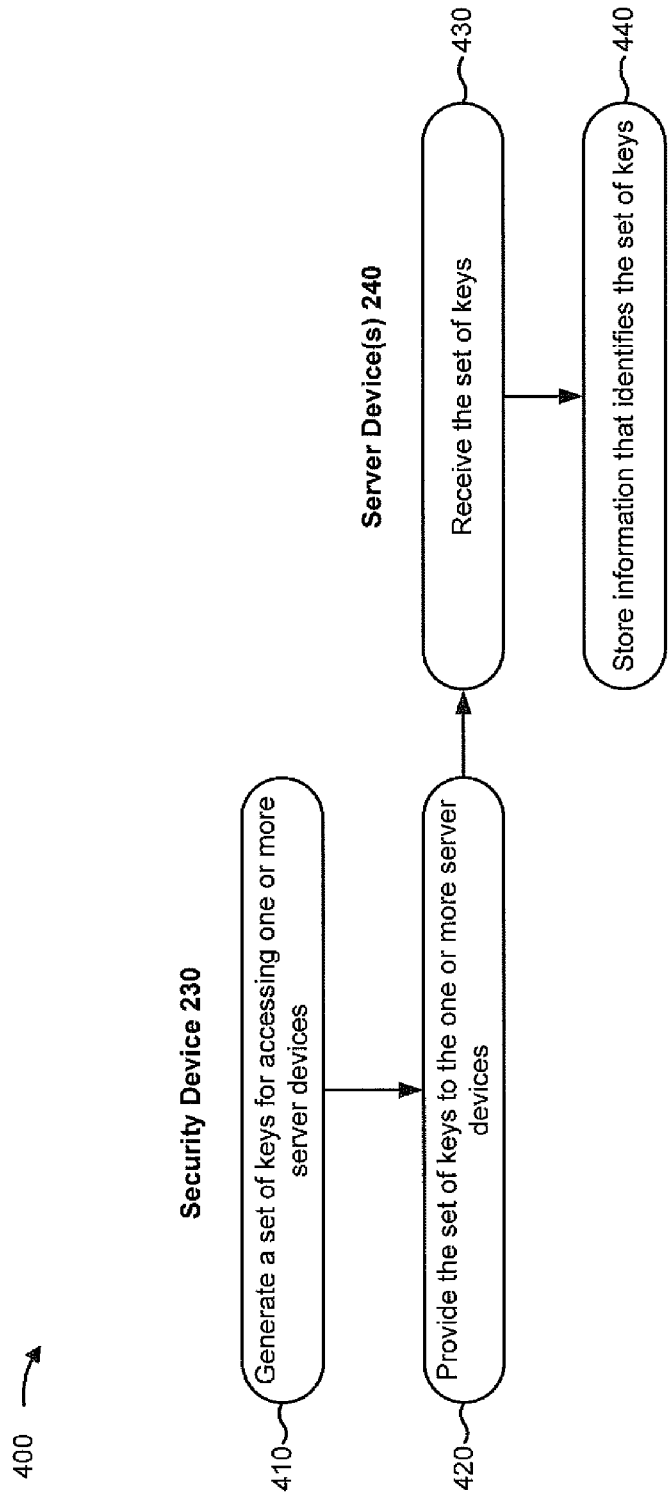
FIG. 4 is a flow chart of an example process for generating and providing a set of keys for providing secure access to server devices in a cloud computing environment.

FIG. 4 is a flow chart of an example process 400 for generating and providing a set of keys for providing secure access to server devices in a cloud computing environment. In some implementations, one or more process blocks of FIG. 4 may be performed by security device 230 and/or server device 240. In some implementations, one or more process blocks of FIG. 4 may be performed by another device or a group of devices separate from or including security device 230 and/or server device 240, such as user device 210 and/or log device 250.

As shown in FIG. 4, process 400 may include generating a set of keys for accessing one or more server devices (block 410), and providing the set of keys to the one or more server devices (block 420). For example, security device 230 may generate a set of keys. The keys may be used to provide access to one or more server devices 240. For example, a key may include a cryptographic key (e.g., a symmetric encryption key, a shared key, etc.), such as information that determines a functional output of a cryptographic algorithm. In some implementations, security device 230 may determine a quantity of keys to generate based on a quantity of users associated with cloud computing environment 220 (e.g., a maximum quantity of users that access cloud computing environment 220, an average quantity of users that access cloud computing environment 220, etc.).

Security device 230 may provide the generated set of keys to one or more server devices 240, in some implementations. For example, security device 230 may provide the generated set of keys to a group of server devices 240 (e.g., a group of server devices 240 included in a cloud computing environment 220 protected by security device 230).

As further shown in FIG. 4, process 400 may include receiving the set of keys (block 430), and storing information that identifies the set of keys (block 440). For example, server device 240 may receive and store the set of keys. In some implementations, each server device 240, in a group of server devices 240, may store the set of keys in a memory accessible by server device 240, such that each server device 240 may perform authentication using the key without accessing a device remote from server device 240. For example, server device 240 may store the set of keys locally. Server device 240 may identify the set of keys as valid keys that are valid for permitting a user to access server device 240.

In some implementations, a key may be revoked, such as when the key is associated with a security breach. In this case, security device 230 may receive (e.g., via input provided by a user, such as a network administrator, and/or input received from another device) information identifying the key that is to be revoked. Security device 230 may remove the revoked key from the set of keys, and may provide an instruction to each server device 240, in the group of server devices 240, to remove the revoked key from the set of valid keys and/or to mark the revoked key as unauthorized. In this way, when a user and/or a device attempts to use the revoked key to access server device 240, server device 240 may deny access to the user and/or the user device.

In some implementations, security device 230 may generate a new key to replace the revoked key, and may notify server devices 240 of the new key. Server device 240 may store the new key as a valid key. Additionally, or alternatively, security device 230 may periodically generate one or more keys and/or may periodically revoke one or more keys. Security device 230 may notify server devices 240 of such generation and/or revocation, such that each server device 240 stores an up-to-date set of valid keys.

In some implementations, multiple server devices 240 may store the same set of keys, which may match a set of keys stored by security device 230 (e.g., a set of keys generated and provided to server devices 240). Additionally, or alternatively, different server devices 240 may store different sets of keys, and security device 230 may store an indication of different sets of keys associated with different server devices 240. Security device 230 may determine a set of keys from which to assign a key based on identifying a server device 240 to which a user is requesting access.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
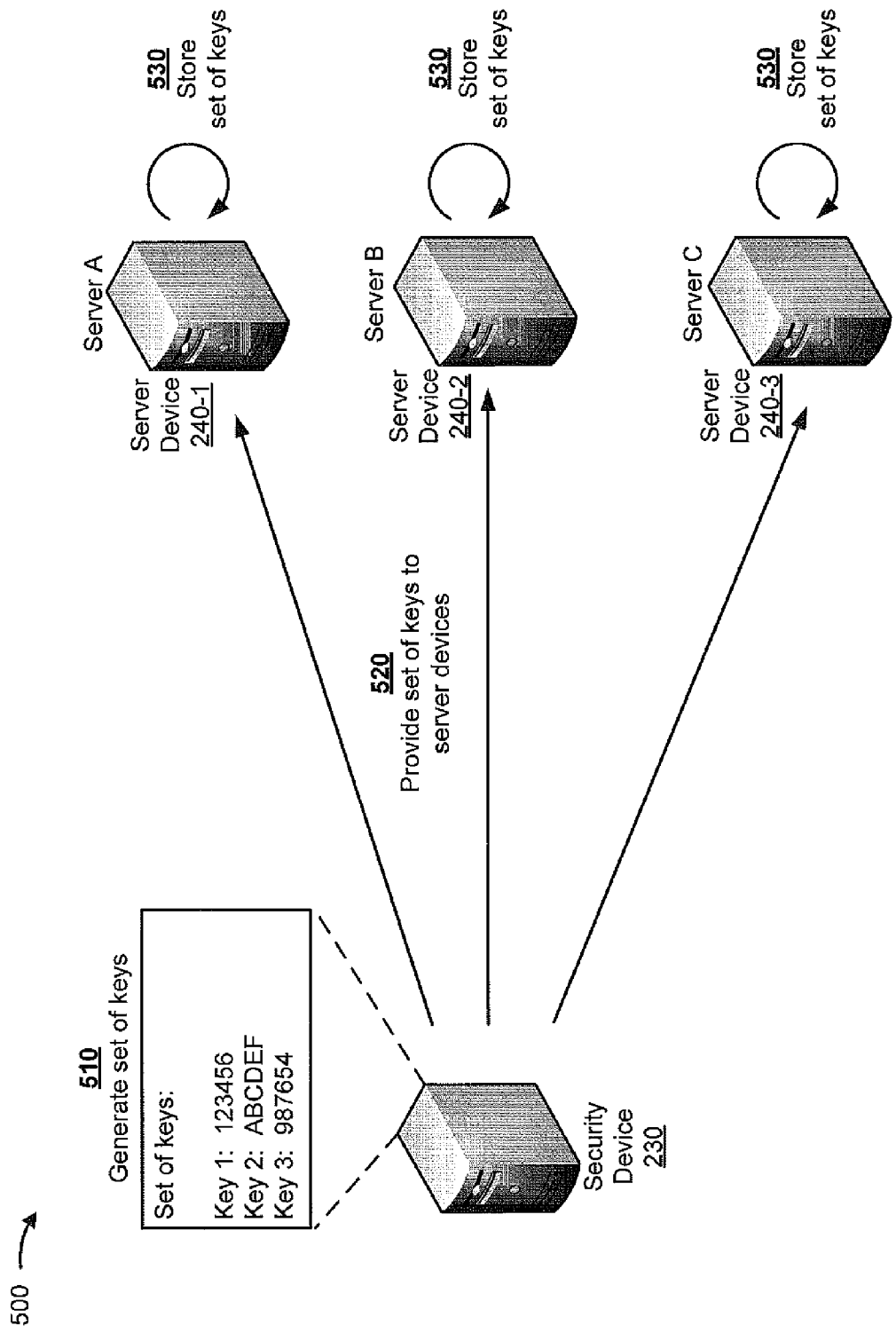
FIG. 5 is a diagram of an example implementation relating to the example process shown in FIG. 4.

FIG. 5 is a diagram of an example implementation 500 relating to example process 400 shown in FIG. 4. FIG. 5 shows an example of generating and providing a set of keys for providing secure access to server devices in a cloud computing environment.

As shown in FIG. 5, and by reference number 510, assume that security device 230 generates a set of keys. For example, assume that security device 230 generates the following three keys: Key 1 (e.g., shown as 123456), Key 2 (e.g., shown as ABCDEF), and Key 3 (e.g., shown as 987654). As shown by reference number 520, assume that security device 230 provides the set of keys to a group of server devices, shown as server device 240-1 (e.g., labeled as Server A), server device 240-2 (e.g., labeled as Server B), and server device 240-3 (e.g., labeled as Server C). As shown by reference number 530, each server device 240 stores the set of keys locally (e.g., in a memory accessible by server device 240 without requiring a network connection, such as a connection with a central authentication server).

As indicated above, FIG. 5 is provided merely as an example. Other examples are possible and may differ from what was described with regard to FIG. 5.

Figure 6:
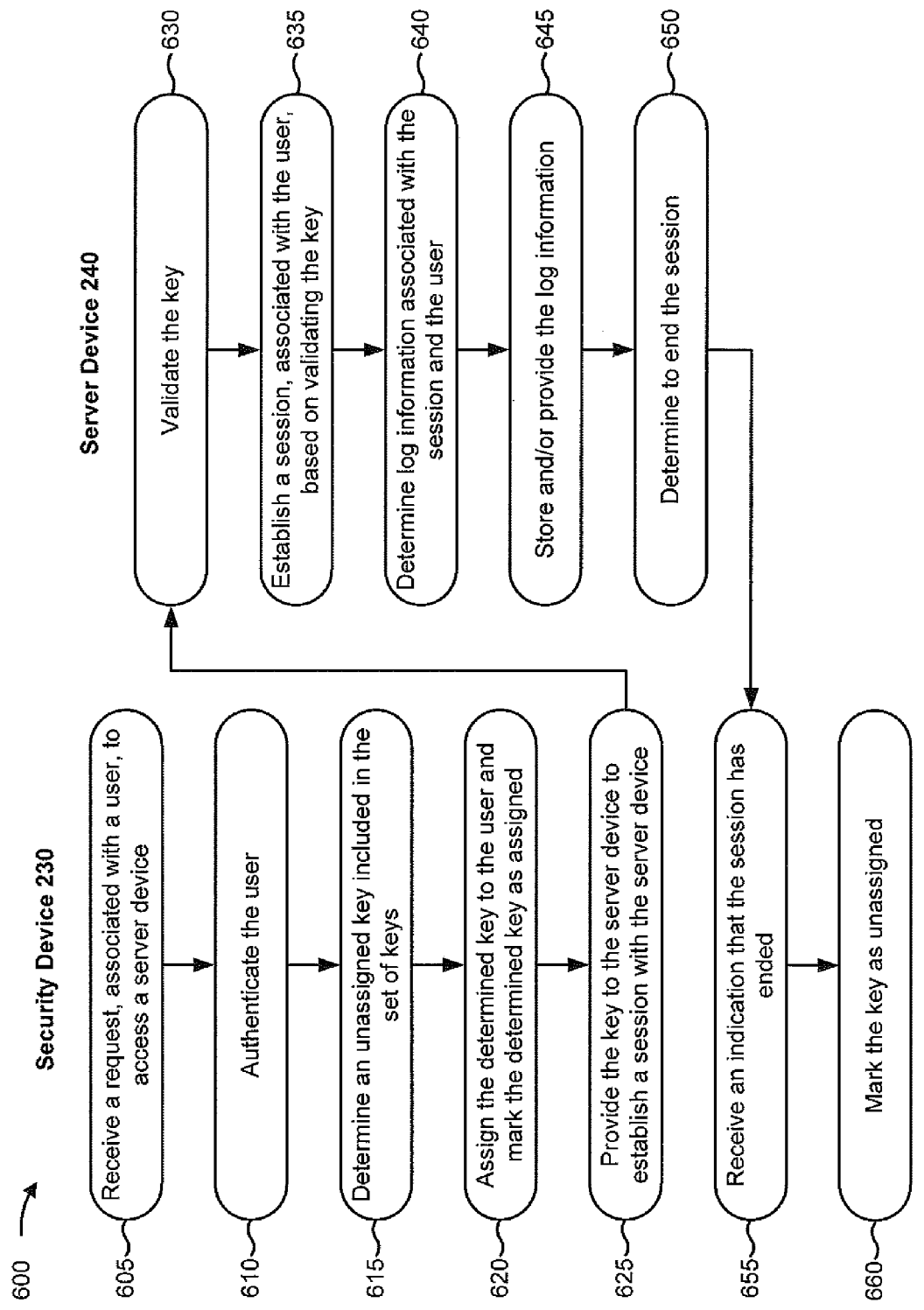
FIG. 6 is a flow chart of an example process for providing a user with secure access to server devices in a cloud computing environment and logging user actions associated with the server devices.

FIG. 6 is a flow chart of an example process 600 for providing a user with secure access to server devices in a cloud computing environment and logging user actions associated with the server devices. In some implementations, one or more process blocks of FIG. 6 may be performed by security device 230 and/or server device 240. In some implementations, one or more process blocks of FIG. 6 may be performed by another device or a group of devices separate from or including security device 230 and/or server device 240, such as user device 210 and/or log device 250.

As shown in FIG. 6, process 600 may include receiving a request, associated with a user, to access a server device (block 605). For example, security device 230 may receive a request, from user device 210, to access server device 240. In some implementations, a user may interact with user device 210 (e.g., via a web browser, a web application, etc.) to cause user device 210 to provide a request (e.g., a HyperText Transfer Protocol (HTTP) request) to access server device 240. In some implementations, the request may identify the user (e.g., via a username or another user identifier). Additionally, or alternatively, the request may include one or more credentials, such as a username, a password, information that identifies user device 210 (e.g., a network address associated with user device 210, a device identifier that identifies user device 210, etc.), or the like.

As further shown in FIG. 6, process 600 may include authenticating the user (block 610). For example, security device 230 may receive a request, associated with a user, and may authenticate the user and/or the request. In some implementations, security device 230 may use a credential, identified in the request, to authenticate the user and/or the request. For example, security device 230 may determine a username and a password identified in the request, and may authenticate the user using the username and password (e.g., by comparing the username and password to credentials stored in a memory accessible by security device 230).

As further shown in FIG. 6, process 600 may include determining an unassigned key included in the set of keys (block 615), assigning the determined key to the user, and marking the determined key as assigned (block 620). For example, security device 230 may determine a key, included in the set of keys, that is not currently assigned to a user. When security device 230 assigns a key to a user, security device 230 may mark the assigned key as being assigned to the user. For example, security device 230 may store an indication, in a memory accessible by security device 230, that the key has been assigned.

Security device 230 may determine a key that has not been marked as assigned (e.g., and/or that has been marked as unassigned), and may assign the determined key to the user associated with the request. Security device 230 may mark the assigned key as being assigned to the user. For example, security device 230 may store an indication that the key has been assigned, and/or may store information that identifies the user to which the key was assigned (e.g., by storing a username or another identifier associated with the user). In this way, security device 230 may prevent the same key from being assigned to different users, such that actions of each individual user may be logged using a unique key.

As further shown in FIG. 6, process 600 may include providing the key to the server device to establish a session with the server device (block 625). For example, security device 230 may use the key to establish a session, associated with a user, between security device 230 and server device 240. In some implementations, security device 230 may forward the request and the key to server device 240. Additionally, or alternatively, security device 230 may provide information identifying the user, associated with the request and/or the key, to server device 240.

As further shown in FIG. 6, process 600 may include validating the key (block 630). For example, server device 240 may receive information that identifies the key, and may validate the key. In some implementations, server device 240 may validate the received key by comparing the received key to a stored set of keys (e.g., valid keys), and determining whether the received key matches a key in the set of keys. Server device 240 may have previously received the set of keys from security device 230, as described herein in connection with FIG. 4.

As further shown in FIG. 6, process 600 may include establishing a session, associated with the user, based on validating the key (block 635). For example, server device 240 may establish a secure session with security device 230. The user may interact with user device 210 to access the session via security device 230. For example, the user may log into security device 230 using a browser executing on user device 210. The user may be permitted to interact with server device 240 (e.g., via a command line interface) via a session established between security device 230 and server device 240. In some implementations, security device 230 may prevent the key from being provided to user device 210 so that the key may remain private and may be reused by the same user (e.g., at a later time) and/or a different user.

Additionally, or alternatively, server device 240 may establish a session with user device 210 using information included in the request (e.g., a network address that identifies user device 210). The session may be established such that communications are routed via security device 230, or the session may be established such that communications are not routed via security device 230.

Additionally, or alternatively, security device 230 may provide the key to user device 210 to establish a session with server device 240. In some implementations, security device 230 may provide the key to user device 210 in a manner that obfuscates the key, such as by providing a link (e.g., via a web browser, via email, etc.) with which a user may interact to provide the request and the key to server device 240 without revealing the key to a user of user device 210. Additionally, or alternatively, security device 230 may encrypt the key so that the user and/or user device 210 cannot access the key. User device 210 may provide the request and the key to server device 240 (e.g., with or without being routed via security device 230). Server device 240 may validate the key and may establish a session with user device 210, using information included in the request, based on validating the key. The session may be established such that communications are routed via security device 230, or the session may be established such that communications are not routed via security device 230.

As further shown in FIG. 6, process 600 may include determining log information associated with the session and the user (block 640), and storing and/or providing the log information (block 645). For example, server device 240 may determine log information associated with the session and/or the user. Log information may include information indicating that the session was established with server device 240, information that identifies actions performed by server device 240 during the session (e.g., based on input provided by a user and received by server device 240, based on commands executed by server device 240, etc.), information indicating that the session was terminated (e.g., that a user actively logged out, that a session expired, etc.), information that identifies a role of the user, information associated with a user privilege, access permission information, etc. Additionally, or alternatively, the log information may identify a user associated with the session and/or the actions, may identify a date and/or time associated with the session and/or the actions (e.g., a session start time, a session end time, a time at which an action was performed, etc.), or the like.

In some implementations, server device 240 may store the log information. Additionally, or alternatively, server device 240 may provide the log information to another device, such as log device 250. In some implementations, server device 240 may periodically provide log information to log device 250 (e.g., at a particular time interval). Additionally, or alternatively, server device 240 may provide log information to log device 250 based on determining and/or storing the log information. For example, a user may input a command to server device 240, and server device 240 may provide information identifying the command (and/or other log information associated with the command) to log device 250 (e.g., within a particular time period after receiving and/or executing the command).

Additionally, or alternatively, server device 240 may provide the log information to log device 250 based on determining that a condition has been satisfied. For example, server device 240 may provide log information, associated with a session, to log device 250 based on determining that the session has ended. As another example, particular actions may be flagged as important, and server device 240 may provide log information to log device 250 based on determining that a particular flagged action has occurred.

Log device 250 may store the log information, may provide the log information for display, may analyze the log information, or the like. In this way, a particular user's interactions with server device 240 may be logged.

In some implementations, server device 240 may provide, to log device 250, information that identifies a key used to establish a session, information that identifies one or more actions performed during the session (e.g., commands executed by server device 240, input received by server device 240, etc.), and a time associated with respective actions. Security device 230 may provide information identifying a key, a time period during which the key was assigned to a user, and the user to which the key was assigned. Log device 250 may aggregate the information received from security device 230 and server device 240, and may use the aggregate information to associate a user with an action.

As further shown in FIG. 6, process 600 may include determining to end the session (block 650), and receiving an indication that the session has ended (block 655). For example, security device 230 and/or server device 240 may determine to end the session. This determination may be based on receiving user input to end the session, determining that the session has expired, determining that a particular amount of time has passed since the session was established, determining that the user has not provided input for a particular amount of time, determining that the session has been compromised, etc. Security device 230 and/or server device 240 may end the session, and security device 230 may receive an indication that the session has ended.

In some implementations, security device 230 may provide log information to log device 250 based on receiving the indication that the session has ended. For example, security device 230 may provide information that identifies a time period associated with the session (e.g., a start time, an end time, etc.), a key associated with the session, and/or a user associated with the session and/or the key (e.g., a user to which the key was assigned during the time period). Log device 250 may match log information received from security device 230 (e.g., information that identifies a key and a user) with log information received from server device 240 (e.g., information that identifies the key and logged actions).

As further shown in FIG. 6, process 600 may include marking the key as unassigned (block 660). For example, security device 230 may determine that a session, established using the key, has ended. Based on this determination, security device 230 may mark the key as unassigned and/or may remove an indication that the key is assigned. In this way, the key may be made available for another user to access server device 240 (e.g., the same server device 240 and/or a different server device 240).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
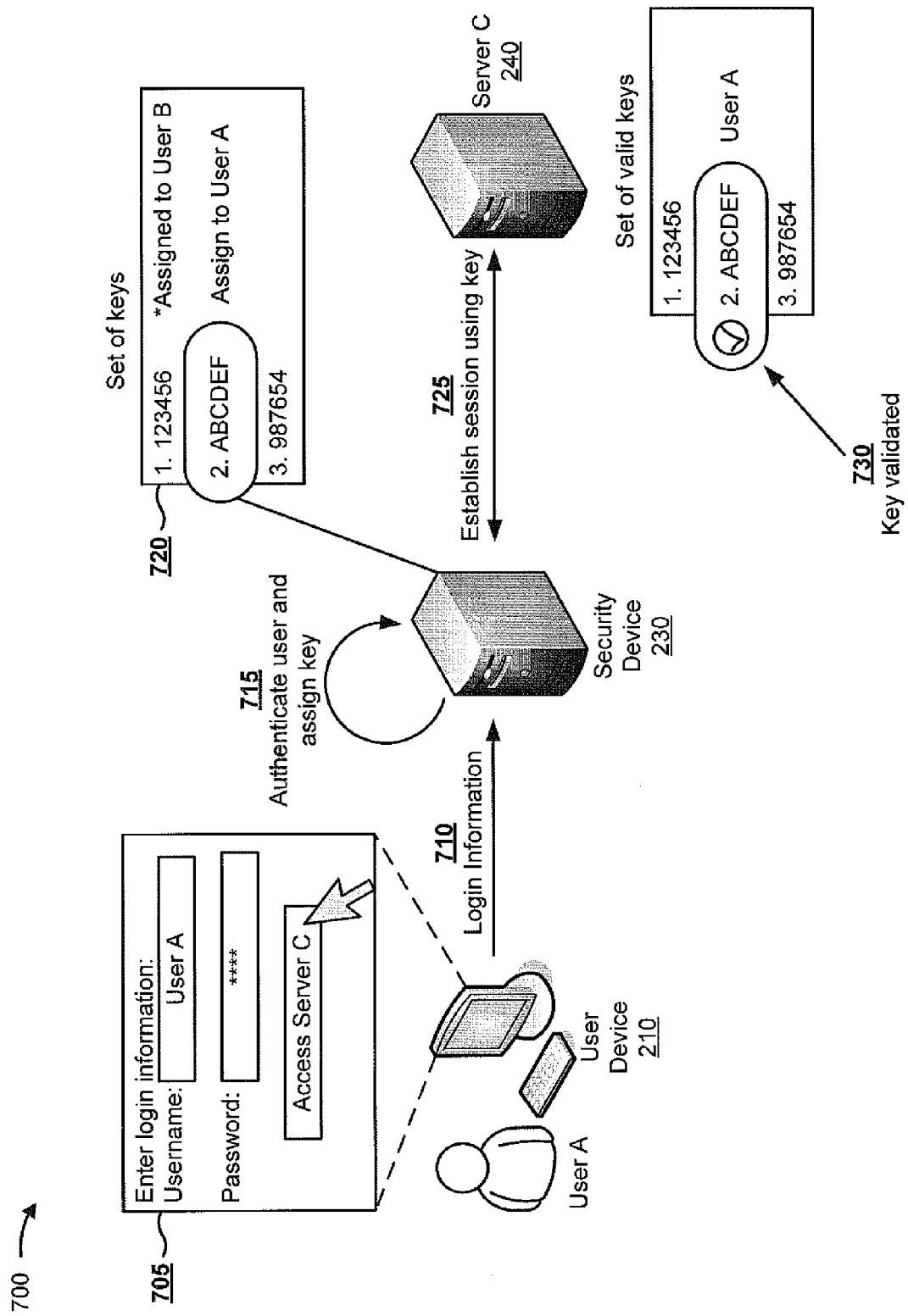
FIGS. 7A-7C are diagrams of an example implementation relating to the example process shown in FIG. 6.
Figure 7B:
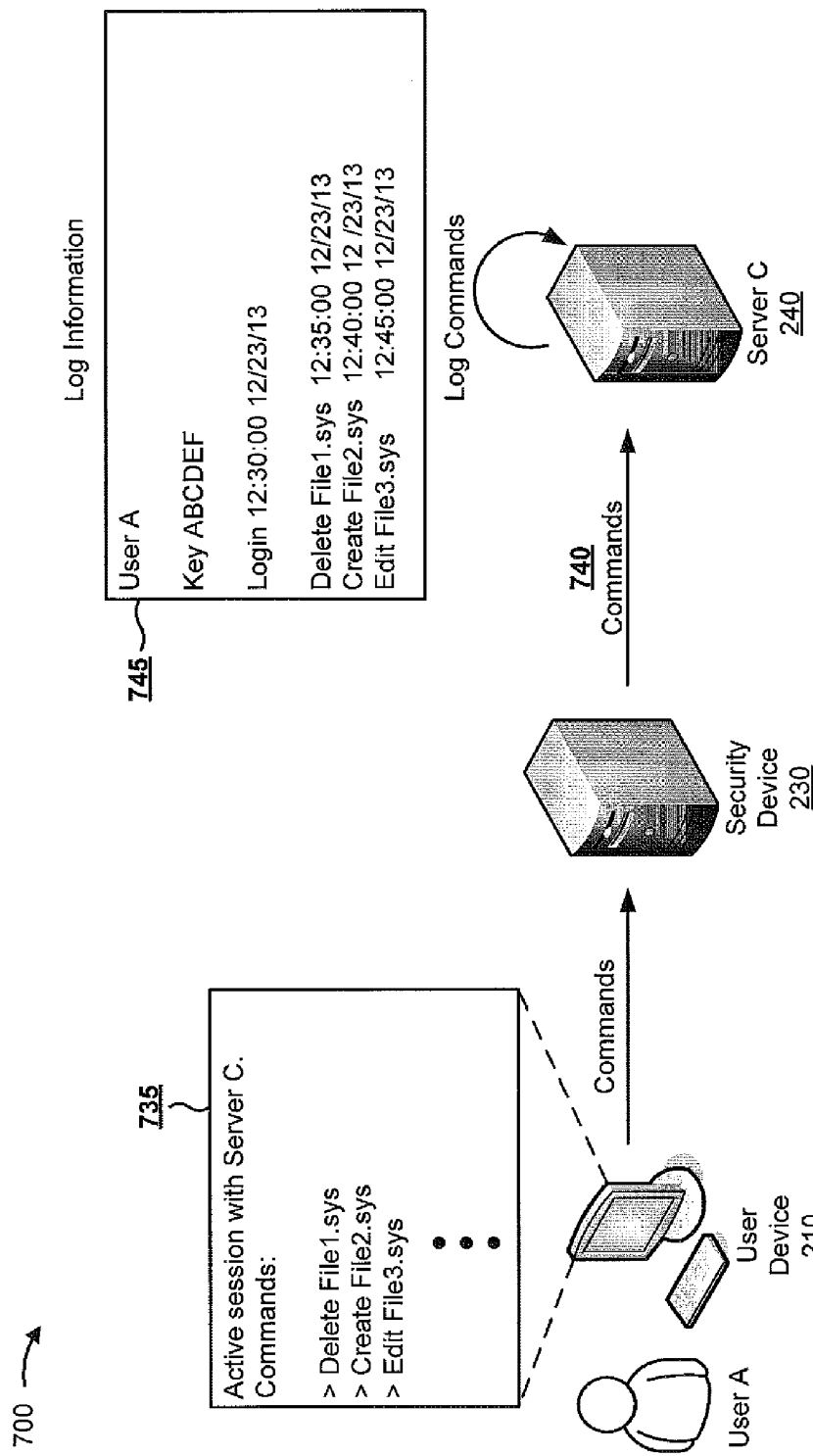
Figure 7C:
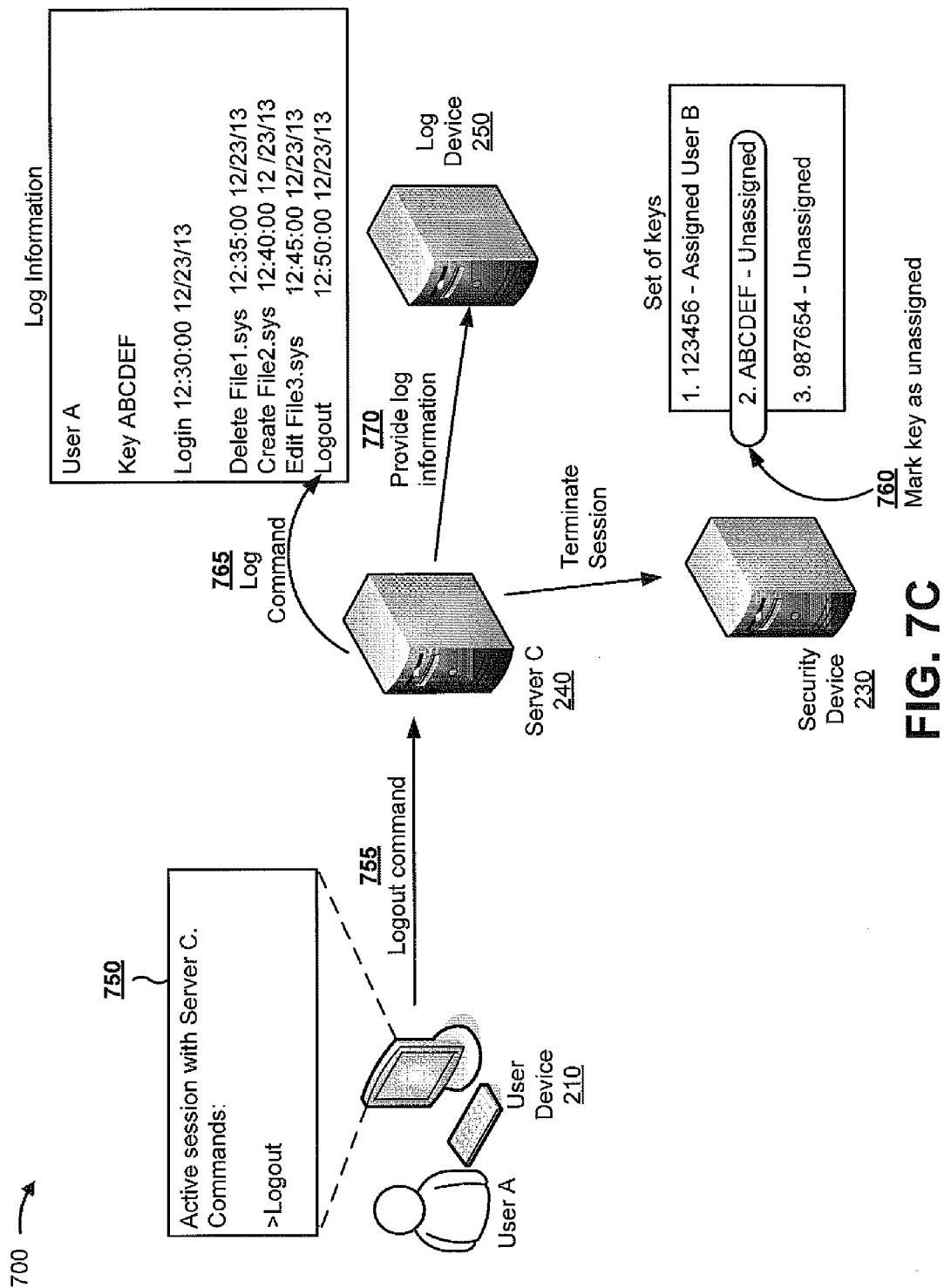

FIGS. 7A-7C are diagrams of an example implementation 700 relating to example process 600 shown in FIG. 6. FIGS. 7A-7C show an example of providing a user with secure access to a server device and logging user actions associated with the server device. For the purpose of FIGS. 7A-7C, assume that security device 230 has generated and provided a set of keys to a group of server devices 240, as shown in FIG. 5.

As shown in FIG. 7A, and by reference number 705, assume that a user, shown as User A, interacts with user device 210 to request access to a server device 240, shown as Server C. For example, assume that User A inputs a username and password as login information. As shown by reference number 710, user device 210 transmits the login information to security device 230. As shown by reference number 715, security device 230 authenticates User A (e.g., using the username and password), and assigns a key to User A. As shown by reference number 720, assume that security device 230 determines that a first key, shown as 123456, is currently assigned to another user, User B. As further shown, assume that security device 230 determines that a second key, shown as ABCDEF, is not currently assigned to any users. Thus, security device 230 assigns key ABCDEF to User A.

As shown by reference number 725, assume that security device 230 and Server C establish a session using key ABCDEF. For example, assume that security device 230 provides key ABCDEF to Server C, and that Server C compares key ABCDEF to a set of valid keys stored by Server C. As shown by reference number 730, assume that Server C determines that key ABCDEF is valid because key ABCDEF is stored in a memory local to Server C (e.g., and key ABCDEF is marked as valid in the memory). Further, assume that Server C associates key ABCDEF with User A (e.g., based on information received from security device 230). Based on determining that key ABCDEF is valid, Server C and security device 230 establish a secure session (e.g., using a handshake process).

As shown in FIG. 7B, and by reference number 735, assume that User A interacts with a command line interface to input commands to be executed by Server C. For example, assume that User A inputs a first command to delete a file named File1.sys, inputs a second command to create a file named File2.sys, and inputs a third command to edit a file named File3.sys.

Based on the user input, security device 230 provides the input commands to Server C, as shown by reference number 740. Assume that Server C executes the commands one at a time, and that after executing each command, Server C logs information identifying the command and information identifying a time at which the command finished executing. Further, assume that Server C logs information identifying the key and information identifying User A. As further shown, assume that Server C logs information identifying a time at which User A logged into Server C (e.g., a time at which the session between security device 230 and Server C was established).

As shown in FIG. 7C, and by reference number 750, assume that User A interacts with user device 210 to input a command to log out of the session with Server C. As shown by reference number 755, assume that Server C receives the logout command (e.g., via security device 230), and terminates the session with security device 230 based on receiving the logout command. As shown by reference number 760, security device 230 receives an indication that the session has been terminated, and marks key ABCDEF as unassigned.

As shown by reference number 765, assume that Server C logs information identifying the logout command and information identifying a time at which the session was terminated. As shown by reference number 770, Server C provides the log information to log device 250. Log device 250 may store the log information, may provide the log information for display, may analyze the log information, or the like. In this way, User A's interactions with Server C may be logged (e.g., to ensure that User A is not performing malicious actions, to ensure that User A is performing authorized actions with Server C, etc.).

As indicated above, FIGS. 7A-7C are provided merely as an example. Other examples are possible and may differ from what was described with regard to FIGS. 7A-7C.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned implementations collect, store, or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly sensitive information.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Similarly, a "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A security device, comprising:
   one or more processors, at least partially implemented in hardware, to:
   receive a first request, associated with a first user, to access a first device;
   authenticate the first user based on information included in the first request;
   determine a first key, from a set of keys stored by the security device, that is unassigned;
   assign the first key to the first user based on authenticating the first user;
   mark the first key as assigned based on assigning the first key to the first user;
   provide the first key to the first device,
      providing the first key causing the first device to validate the first key by comparing the first key to a set of valid keys,
         the set of valid keys being stored in a memory accessible by the first device based on having been previously provided to the first device by the security device;
   establish a first session with the first device based on providing the first key to the first device and based on causing the first device to validate the first key;
   provide the first user with access to the first device via the first session;
   receive a second request, associated with a second user, to access a second device;
   authenticate the second user based on information included in the second request;
   determine a second key, from the set of keys, that is unassigned and that is different from the first key assigned to the first user;
   assign the second key to the second user based on authenticating the second user;
   mark the second key as assigned based on assigning the second key to the second user;
   provide the second key to the second device,
      providing the second key causing the second device to validate the second key based on the set of valid keys,
         the set of valid keys being stored in a memory accessible by the second device and having been previously provided to the second device by the security device;
   establish a second session with the second device based on providing the second key; and
   provide the second user with access to the second device via the second session.

2. The security device of claim 1, where the one or more processors are further to:
   provide a command, input by the first user, to the first device,
      providing the command causing the first device to execute the command and store log information that identifies the command and the first user.

3. The security device of claim 2, where the log information further identifies at least one of:
   a time at which the first session was established; or
   a time at which the first session was terminated.

4. The security device of claim 1, where the one or more processors are further to:
   receive an indication that the first session is to be terminated;
   cause the first session to be terminated based on receiving the indication that the first session is to be terminated;
   prevent the first user from accessing the first device via the first session based on causing the first session to be terminated; and
   mark the first key as unassigned based on causing the first session to be terminated.

5. The security device of claim 1, where the one or more processors are further to:
   generate the set of keys,
      the set of keys including the set of valid keys; and
   provide the set of keys to a plurality of devices,
      the plurality of devices including the first device.

6. The security device of claim 5, where the one or more processors are further to:
   determine that a particular key, of the set of keys, is to be revoked;
   remove the particular key from the set of keys based on determining that the particular key is to be revoked; and
   provide, to the plurality of devices, an indication that the particular key has been revoked based on determining that the particular key is to be revoked,
      providing the indication causing the plurality of devices to remove the particular key from the set of valid keys stored in respective memory devices accessible by respective devices included in the plurality of devices.

7. The security device of claim 6, where the one or more processors are further to:
   generate a new key to replace the particular key that has been removed from the set of keys;
   add the new key to the set of keys based on generating the new key; and
   provide the new key to the plurality of devices, providing the new key causing the plurality of devices to add the new key to the set of valid keys stored in respective memory devices accessible by respective devices included in the plurality of devices.

8. A non-transitory computer-readable medium storing instructions, the instructions comprising:
one or more instructions that, when executed by one or more processors, cause the one or more processors to:
receive, by a first device, a first request to access a second device,
the first request being associated with a first user;
authenticate the first user based on receiving the first request;
identify, based on authenticating the first user, a first key that is not assigned to another user,
the first key being included in a first set of keys accessible by the first device;
assign the first key to the first user based on identifying the first key;
store an indication that the first key has been assigned to the first user based on assigning the first key to the first user;
provide the first key and information that identifies the first user to the second device,
providing the first key causing the second device to validate the first key by comparing the first key to a second set of keys,
the second set of keys being included in the first set of keys, and having been previously provided to the second device by the first device for storage by the second device;
establish a first session with the second device based on providing the first key to the second device and based on causing the second device to validate the first key;
provide the first user with access to the second device via the first session;
receive a second request, associated with a second user, to access a third device,
the third device being different from the second device;
authenticate the second user based on receiving the second request;
identify, based on authenticating the second user, a second key, included in the first set of keys, that is different from the first key assigned to the first user;
assign the second key to the second user based on identifying the second key;
store an indication that the second key has been assigned to the second user based on assigning the second key to the second user;
provide the second key to the third device to cause the third device to validate the second key by comparing the second key to the second set of keys,
the second set of keys being previously provided to the third device by the first device for storage by the third device;
establish a second session with the third device based on providing the second key to the third device and based on causing the third device to validate the second key; and
provide the second user with access to the third device via the second session.

9. The non-transitory computer-readable medium of claim 8, where the one or more instructions further cause the one or more processors to:
receive a command associated with the first user; and
provide information that identifies the command to the second device to provide the information that identifies the command causing the second device to execute the command and store log information that identifies the command.

10. The non-transitory computer-readable medium of claim 8, where the one or more instructions further cause the one or more processors to:
terminate the first session;
prevent the first user from accessing the second device via the first session based on terminating the first session; and
store an indication that the first key is not assigned based on terminating the first session.

11. The non-transitory computer-readable medium of claim 8, where the one or more instructions further cause the one or more processors to:
generate the first set of keys; and
provide the first set of keys, to a plurality of devices that include the second device, to cause the plurality of devices, including the second device, to store the second set of keys.

12. The non-transitory computer-readable medium of claim 8, where the first set of keys and the second set of keys are an identical set of keys.

13. The non-transitory computer-readable medium of claim 8, where the one or more instructions further cause the one or more processors to:
receive a third request, associated with the second user, to access the second device;
authenticate the second user based on receiving the third request;
identify, based on authenticating the second user, a third key, included in the first set of keys;
assign the third key to the second user based on identifying the third key;
store an indication that the third key has been assigned to the second user based on assigning the third key to the second user;
provide the third key and information that identifies the second user to the second device to cause the second device to validate the third key;
establish a third session with the second device based on providing the third key to the second device and based on causing the second device to validate the third key; and
provide the second user with access to the second device via the third session.

14. A method, comprising:
receiving, by a first device, a first request to access a second device,
the first request being associated with a first user;
authenticating, by the first device, the first user based on receiving the first request;
identifying, by the first device and based on authenticating the first user, a first key that is not currently assigned to a second user,
the first key being included in a first set of keys accessible by the first device;
assigning, by the first device, the first key to the first user based on identifying the first key;
marking, by the first device, the first key as assigned based on assigning the first key to the first user;
providing, by the first device and to the second device, information that identifies the first key,
providing the information that identifies the first key causing the second device to validate the first key by comparing the first key to a second set of keys, the second set of keys being included in the first set of keys, and having been previously provided to the second device by the first device for storage in a memory accessible by the second device;

establishing, by the first device, a first session with the second device based on providing the information that identifies the first key to the second device and based on causing the second device to validate the first key;

receiving, by the first device, information that identifies a command based on input associated with the first user; and providing, by the first device and to the second device via the first session, information that identifies the command,
- providing the information that identifies the command causing the second device to store log information that identifies the command and the first user;

receiving, by the first device, a second request, associated with the second user, to access a third device;

authenticating, by the first device, the second user based on receiving the second request;

identifying, by the first device and based on authenticating the second user, a second key, included in the first set of keys, that is different from the first key assigned to the first user;

assigning, by the first device, the second key to the second user based on identifying the second key;

marking, by the first device, the second key as assigned based on assigning the second key to the second user;

providing, by the first device and to the third device, information that identifies the second key; and establishing, by the first device, a second session with the third device based on providing the information that identifies the second key to the third device and based on causing the third device to validate the second key.

15. The method of claim 14, further comprising:
terminating the first session; and
marking the first key as unassigned based on terminating the first session.

16. The method of claim 14, further comprising:
generating the first set of keys; and
providing the first set of keys to a plurality of devices that include the second device,
- providing the first set of keys causing the second device to store the second set of keys in the memory accessible by the second device,
- the second set of keys being a same set as the first set of keys.

17. The method of claim 14, where the log information further identifies at least one of:
a time at which the command was executed by the second device;
a time at which the first session was established; or
a time at which the first session was terminated.

18. The method of claim 14, further comprising:
causing the second device to provide the log information to a log device.

19. The method of claim 14, further comprising:
receiving information that identifies a command based on input associated with the first user; and
providing, to the second device and via the first session, information that identifies the command.

20. The method of claim 19, further comprising:
causing the second device to provide, to a log device, the information that identifies the command.

* * * * *